Dec. 23, 1969     R. W. PETERS     3,484,923

APPARATUS FOR WINDING STATOR COILS

Filed Aug. 23, 1967

Inventor
Robert W. Peters
By Wheeler, Wheeler, House & Clemency
Attorneys

United States Patent Office 3,484,923
Patented Dec. 23, 1969

3,484,923
APPARATUS FOR WINDING STATOR COILS
Robert W. Peters, Menomonee Falls, Wis., assignor to Henry J. Gorski, Milwaukee, Wis.
Filed Aug. 23, 1967, Ser. No. 662,597
Int. Cl. H02k 15/00
U.S. Cl. 29—205    3 Claims

ABSTRACT OF THE DISCLOSURE

A stator winding machine attachment which is adapted to be mounted on a stator prior to winding and includes a pair of semi-circular members hingedly connected together for movement from an open to a closed position. A number of tabs are equally spaced around the interior edge of each of the members in corresponding relation to the distance between the slots in the stator. The attachment includes a locator ear which projects inwardly from the interior edge of one of the members to positively locate the attachment relative to the stator.

BACKGROUND OF THE INVENTION

This invention relates to the winding of stators and more particularly to an attachment which is used in conjunction with an automatic stator winding machine.

Automatic winding machines for winding stator coils include a reciprocally movable shuttle such as shown in the Friedrich application S.N. 340,302. These machines include a reciprocally movable shuttle having a winding head at one end with a number of lift levers supporting wire guides. As the winding head emerges from the bore of the stator, the wire guides are moved radially outwardly. This movement by the wire guides imposes a strain on the end of the insulators which are positioned in the solts of the stator, often distorting or damaging the insulator so that its effectiveness is reduced if not destroyed.

SUMMARY OF THE INVENTION

The primary object of the present invention is to provide an attachment and method for its use which prevents such distortion of the wire inuslator during the winding of the stator. This object is achieved by mounting an attachment on each end of the stator prior to mounting the stator in the stator winding machine. The attachment has a pair of semi-circular members which are hingedly connected together so that the attachment can be opened, placed on the stator, and closed against the backs of the insulator. Upstanding tabs are provided on the inner edge of the attachment at spaced intervals corresponding to the location of the insulators in the slots of the stator. Each tab projects upwardly a distance substantially equal to the height of the insulator above the surface of the stator. A locating ear is provided between two of the tabs and projects inwardly for insertion between two adjacent insulators in the stator, thus positively locating the tabs in corresponding relation to the backs of the insulators.

Other objects and advantages will become apparent from the following detailed description when read in connection with enclosed drawings in which.

Figure 1:
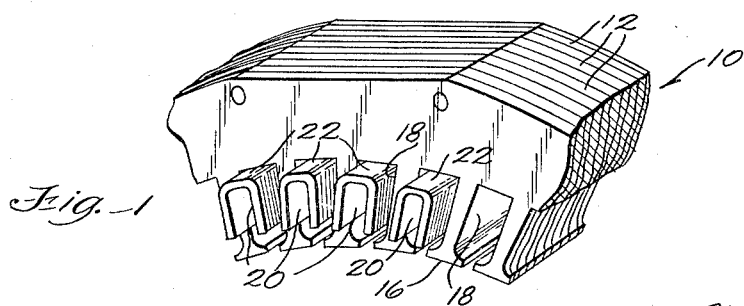
FIG. 1 is a perspective view of a section of the stator showing the wire insulation prior to winding.

Referring more particularly to FIG. 1 of the drawings, the stator 10 conventionally includes a series of lamina 12 which are assembled in registry with each other and are held together by any appropriate means. The stator has a central bore 16 with a series of slots 18 extending radially outwardly from the bore. U-shaped insulators 20 are respectively positioned in each of the slots and are turned back at each end to form lip 22 extending outwardly a short distance from the adjacent face of the stator. The wire coils are layed in part in the insulators in the slot and in part in arcuate form between the ends of the insulators and clear of the bore.

Such wire winding can be accomplished by means of an automatic wire winding device such as shown in copending application Ser. No. 340,302. As seen in application Ser. No. 340,302 a winding head on the end of a shuttle is moved through the bore of the stator and oscillated after it emerges from each end of the bore to align the wire guides with different slots in the bore. After the winding head emerges from the bore the lift levers in association with the head oscillation move the wire guides radially outwardly to produce the arcuate form of the wire between the slots. This radially outward movement can impose a strain on the lip of the insulator thereby causing the lip to bend and possibly break.

Figure 2:
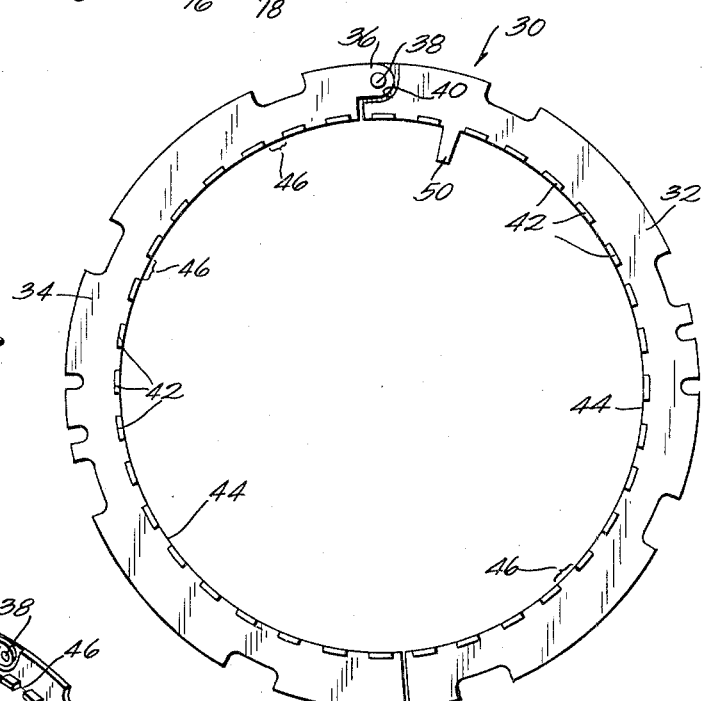
FIG. 2 is a top view of the stator winding attachment in a closed position.
Figure 3:
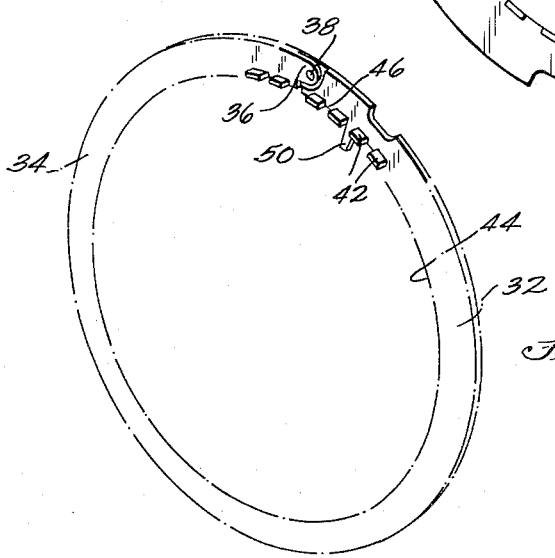
FIG. 3 is an end view of the attachment showing the spacing of the tabs.

Referring to FIG. 2, the wire winding attachment 30 includes two flat semi-circular members 32 and 34 which are hingedly connected together by means of an extension or projecting part 36 on member 34 which part is pivotally connected to member 32 by means of a rivet 38. The part is movable within a recessed section 40 on the end of the member 32 to maintain a substantially smooth transition across the surface of the ring members.

The back of the lip on the ends of the insulators is supported during the wire winding by a number of equally spaced upstanding tabs 42 provided around the inner edge 44 of each of the ring members. The distance 46 between the tabs corresponds to the distance between the insulators on the stator so that the tabs will be aligned with the backs of the insulators when the attachment is mounted on the stator. Each tab has a height which corresponds substantially to the height of the insulator lip and thereby provides a support or reinforcement for the back of the insulator lip when the wire is pulled to the next slot by the oscillation of the winding head.

The attachment must be positively aligned on the face of the stator to assure that the tabs are properly located with respect to the insulators. This is accomplished by providing a locating ear 50 between two adjacent insulators.

An attachment is mounted on each end of a stator by the following method. The attachment is opened and alinged with the end face of the stator. Member 34 having ear 50 is moved into engagement with the insulators with the ear inserted between the lips of two adjacent insulators. Member 34 is then closed to form a complete circle with the tabs respectively aligned behind the backs of the insulator lips. When the stator is clamped in the automatic winding machine, the attachments on each end of the stator will be rigidly held in position by the clamping action. Other arrangements can be employed to hold the members on the stator.

Although only one embodiment of the present invention has been shown and described it should be apparent that various changes and modifications can be made therein without departing from the scope of the appended claims.

What is claimed is:

1. A wire winding attachment for a stator having a central bore and a number of spaced slots extending radially outward from the bore and an insulator respectively positioned in each slot and projecting outwardly from each end of the slots to form a lip, said attachment comprising a pair of curved members, each curved member having a number of upstanding tabs along the inner edge, hinge means connected to said members whereby said members can be closed to align the tabs with the lip of the insulators in each slot, and a locating ear secured to one of said members and adapted to be inserted between the lips on two adjacent insulators to positively locate said tabs in supporting relation to the lips when said members are closed.

2. A wire winding attachment according to claim 1 wherein each of said tabs is spaced from the adjacent tabs a distance equal to the distance between the slots in the stator.

3. A wire winding attachment according to claim 1 wherein said hinge means comprises an extension on one of said curved members and a recess in the other of said members, said extension being pivotally mounted in said recess.

References Cited

UNITED STATES PATENTS

| | | | |
|---|---|---|---|
| 2,968,088 | 1/1961 | Hautau et al. | 29—605 |
| 3,323,734 | 6/1967 | Peters | 242—1.1 |
| 3,334,825 | 8/1967 | Friedrich | 242—1.1 |

JOHN F. CAMPBELL, Primary Examiner

CARL E. HALL, Assistant Examiner

U.S. Cl. X.R.

29—596, 605; 242—1.1